US010951000B2

(12) United States Patent
Ferin et al.

(10) Patent No.: US 10,951,000 B2
(45) Date of Patent: Mar. 16, 2021

(54) HIGH POWER SINGLE MODE FIBER LASER

(71) Applicant: IPG PHOTONICS CORPORATION, Oxford, MA (US)

(72) Inventors: Anton Ferin, Oxford, MA (US); Valentin Fomin, Oxford, MA (US); Andrey Abramov, Oxford, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 303 days.

(21) Appl. No.: 15/764,147

(22) PCT Filed: Sep. 20, 2016

(86) PCT No.: PCT/US2016/052626
§ 371 (c)(1),
(2) Date: Mar. 28, 2018

(87) PCT Pub. No.: WO2017/105574
PCT Pub. Date: Jun. 22, 2017

(65) Prior Publication Data
US 2019/0058300 A1 Feb. 21, 2019

Related U.S. Application Data

(60) Provisional application No. 62/234,333, filed on Sep. 29, 2015.

(51) Int. Cl.
*H01S 3/00* (2006.01)
*H01S 3/067* (2006.01)
(Continued)

(52) U.S. Cl.
CPC ............ *H01S 3/005* (2013.01); *B23K 26/064* (2015.10); *B23K 26/21* (2015.10); *B23K 26/36* (2013.01);
(Continued)

(58) Field of Classification Search
CPC .... H01S 3/005; H01S 3/06745; H01S 3/0604; H01S 3/06754; H01S 3/302; B23K 26/21;
(Continued)

(56) References Cited

U.S. PATENT DOCUMENTS 8,873,134 B2 * 10/2014 Price ..................... G02B 6/14
359/341.1
9,716,365 B2 * 7/2017 Gapontsev .......... H01S 3/06737
(Continued)

FOREIGN PATENT DOCUMENTS

CN 103682965 3/2014
WO 2013109902 7/2013

OTHER PUBLICATIONS

International Search Report dated Jul. 6, 2017 in related PCT Application No. PCT/US2016/052626.

*Primary Examiner* — Dana Ross
*Assistant Examiner* — Ket D Dang
(74) *Attorney, Agent, or Firm* — Caroline J. Roush, Esq.; Yuri B. Kateshov, Esq.

(57) ABSTRACT

A single mode (SM) high power laser system is configured with a laser source outputting a single mode or low mode kW-power light and a passive delivery fiber spliced to an output fiber of the fiber laser source and having a double bottleneck-shaped core. The latter is configured to increase a threshold for nonlinear effects in general and in particular for stimulated Raman scattering (SRS) so that the delivery passive fiber has a fiber length at least twice the length of a delivery passive fiber with a standard uniformly dimensioned core, which may be used with the same laser source, while outputting the kW-power light with an M2 factor less than 2.

10 Claims, 3 Drawing Sheets

(51) Int. Cl.
  *B23K 26/36*   (2014.01)
  *G02B 6/42*   (2006.01)
  *B23K 26/21*   (2014.01)
  *B23K 26/064*  (2014.01)
  *H01S 3/30*   (2006.01)
  *G02B 6/24*   (2006.01)
  *H01S 3/06*   (2006.01)

(52) U.S. Cl.
  CPC ............ *G02B 6/421* (2013.01); *G02B 6/4296* (2013.01); *H01S 3/06745* (2013.01); *H01S 3/06754* (2013.01); *H01S 3/302* (2013.01); *G02B 6/241* (2013.01); *H01S 3/0604* (2013.01)

(58) Field of Classification Search
  CPC ...... B23K 26/064; B23K 26/36; G02B 6/241; G02B 6/4296; G02B 6/421
  USPC .................................................. 219/121.73
  See application file for complete search history.

(56) References Cited

U.S. PATENT DOCUMENTS

| | | | |
|---|---|---|---|
| 2010/0135339 A1 | 6/2010 | Meleshkevich et al. | |
| 2012/0262781 A1* | 10/2012 | Price | G02B 6/14 |
| | | | 359/341.3 |
| 2013/0034326 A1 | 2/2013 | Gapontsev et al. | |
| 2014/0286362 A1* | 9/2014 | Gapontsev | H01S 3/06754 |
| | | | 372/6 |

* cited by examiner

HIGH POWER SINGLE MODE FIBER LASER

BACKGROUND OF THE INVENTION

Field of the Disclosure

This disclosure relates to high power single mode (SM) fiber lasers with a double-bottleneck shaped delivery fiber configured to deliver laser light to remote locations.

Known Prior Art

High power, high brightness fiber sources are of great interest for various applications such as, among others, micro-machining, welding and material processing, and their output power has grown astronomically in recent years. However, power scaling with a single mode output beam quality, which requires a small core fiber, still remains a technological challenge, in the first instance because of the nonlinear scattering in the fiber. In particular, stimulated Raman scattering (SRS)—nonlinear effect (NLE)—is one of the main constraints on increasing the output power of a fiber based system and its length. Generally, the SRS threshold power $P_{th}$ is determined as $$P_{th} \approx \frac{Aeff}{L},$$

$A_{eff}$ is the effective mode area of the fiber, and L is the fiber length. Thus, in order to raise a threshold for nonlinear effects including SRS, a large core and a short fiber length are two of the obvious choices that work by reducing the optical power density in the doped-core and the interaction length of the optical field along the fiber.

As the core diameter becomes larger, the power density lowers and NLE threshold increases. With the latter, power handling capabilities of fiber laser improve. However, the core supports the SM only if its diameter does not exceed a certain limit after which the excitement of higher order modes cannot be prevented. A single mode output can still be obtained using an over the limit large core fiber with filtering of higher order mode, e.g., with a fiber taper. For example, U.S. Pat. No. 8,781,272 ('272), incorporated here in its entirety by reference, discloses a monolithic optical non-micro-structured fiber configured with a multimode ("MM") core which has a double bottleneck-shaped cross-section. Despite being MM, the core is capable of supporting substantially only a fundamental mode. The fibers disclosed in '272 constitute a fiber block which includes at least an active fiber and output passive fiber, and the system, operating in a continuous wave (CW) regime, may have one or more of such fiber blocks to reach tens of kW at the output of the delivery fiber. Operating in conditions requiring SM delivery fibers not exceeding 5 meters at 1 kW power, no appreciable power losses have been observed. However, once the SM delivery fiber, having a uniformly configured core, was used for delivering the laser output at a distance exceeding 5 meters even with such a relatively modest 1 kW power, the delivered light experienced high power losses and greatly decreased quality. As the recent work to decommission the Fukushima Daiichi nuclear power facility exemplifies, substantially greater lengths of the delivery fiber providing SM high power laser light beam are often necessary.

A need therefore exists for a high power SM fiber laser provided with a delivery fiber which while guiding light at a distance substantially greater than is currently available, does not detrimentally affect the quality of light and its power.

SUMMARY OF THE DISCLOSURE

This need is satisfied by the inventive SM, high power fiber laser configured with a light source, which emits SM, kW-level light, and a multi-meter delivery fiber, i.e., the fiber (aka as feeding fiber) delivering light to a laser head or directly from the laser head to the workpiece to be laser treated or both, that outputs the emitted light having an $M^2$ value of less than 2.

Depending on the power of the laser source ranging between 1 and 50 kW, the inventive delivery fiber has the length varying between about 2 and 20 meters, with the 20 m long fiber being used in a 1 kW fiber laser system. Despite the impressive length of the delivery fiber if compared to the currently known designs, the disclosed delivery fiber outputs the light with an $M^2$ value of about 1.05 which is substantially lower than the same laser systems equipped with regular cylindrical fibers.

The delivery fiber is configured with a monolithic core having a double bottle neck cross-section which suppresses the onset of SRS. With a high threshold for NLE, the length of the delivery fiber configured in accordance with the invention, is at least twice as long as a standard, uniformly configured delivery fiber, provided both types of the delivery fiber are used with the same system having the same parameters.

BRIEF DESCRIPTION OF THE DRAWING

The above and other features and advantages will become more readily apparent from the specific description of the present disclosure accompanied by the following drawings, in which.

SPECIFIC DESCRIPTION

Figure 1:
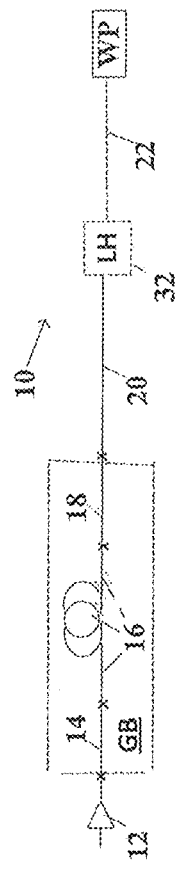
FIG. 1 is an overall view of the disclosed SM fiber laser system.

Reference will now be made in detail to the disclosed system. Wherever possible, same or similar reference numerals are used in the drawings and the description to refer to the same or like parts or steps. The drawings are in simplified form being far from precise scale. For purposes of convenience and clarity only, the terms "connect," "couple," and similar terms with their inflectional morphemes do not necessarily denote direct and immediate connections, but also include connections through mediate elements or devices.

Referring to FIG. 1 a high power single mode fiber laser system 10 is operative to continuously output radiation in a single mode or low modes with an $M^2$ value of at most equal to 2, but preferably lower than 1.5 and even lower than 1.1. The SM fiber laser system 10 may be configured with a laser source configured either as a fiber laser or disc laser. The following description discloses a fiber laser, but one of ordinary skill in the art readily recognizes that the invented delivery fiber can be used in combination with a disc laser source.

The system 10 thus includes a seed 12 outputting signal light which propagates through a fiber length including at least one amplifying stage which is configured with an input SM passive fiber 14, active fiber 16 and output SM passive fiber 18 together constituting a fiber gain block GB. The active fiber 16 may have a cylindrical or bottleneck-shaped core. The increased number of gain blocks GB allows higher output powers. Therefore, the power range of the disclosed system is reasonably unlimited since several SM systems 10 can be combined together so that the system power may vary in a 1-50 kW power range and higher. The high power SM signal light emitted from the GB is coupled into a fiber 20 guiding the signal light to a processing laser head 32 which is typically configured with a housing enclosing necessary optics. Sometimes, LH 32 may be configured such that an additional delivery 22 is needed to guide light from the laser head to the workpiece to be treated WP. Usually, fiber 20 is referred to as a feeding fiber while fiber 22 is typically called a delivery fiber. For the purposes of this disclosure, however, both fibers 20 and 22 are referred to as the delivery fiber.

As soon as the fiber laser industry realized the possibility of scaling SM fiber lasers, many efforts were directed to perfecting active fiber 16 and sometimes passive fibers 14, 18 constituting a gain block. Adhering to the main approach including increasing the core diameter and decreasing the fiber length, multi-kW powers in SM CW have been obtained due to the bottleneck-shaped active and passive fibers of the gain block. But delivery fiber 20 and/or 22 remains unaltered featuring a maximum uniform SM core diameter. In the past, to maintain an acceptable threshold for NILE in multi-kW systems with the desired $M^2$ factor, a length of the delivery fiber was as short as possible. In contrast to the conventional wisdom, the inventive concept requires greater, not shorter, lengths of delivery fiber 20, 22.

Figure 2:
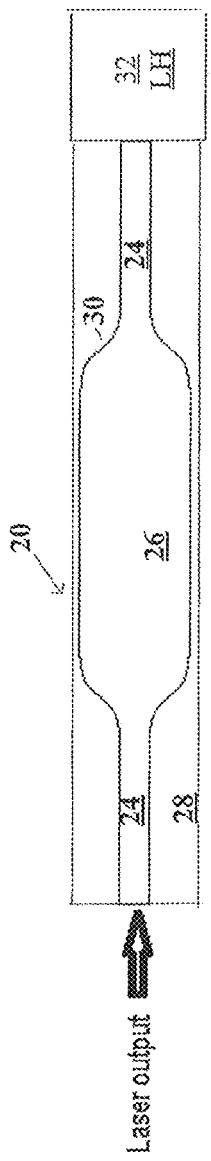
FIG. 2 is one embodiment of the disclosed delivery fiber of FIG. 1.
Figure 3:
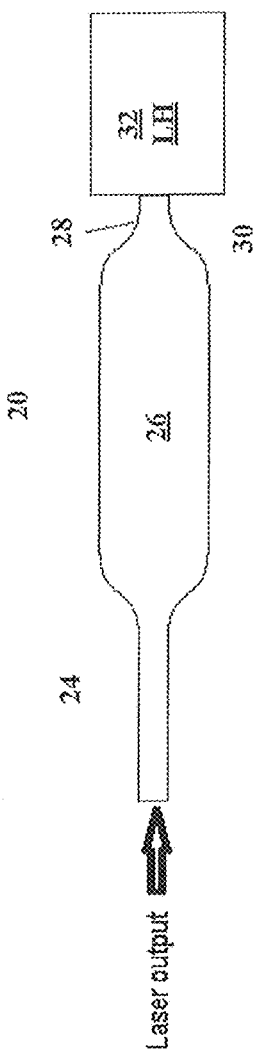
FIG. 3 is another embodiment of the disclosed delivery fiber of FIG. 1.

Referring to FIGS. 2 and 3, a delivery fiber 20 (and fiber 22) has a monolithic double bottleneck-shaped core which includes input and output core sections 24 and central core section 26, and either bottlenecked-shaped or cylindrically-shaped cladding 28. The core is configured such that input and output core sections 24 respectively are dimensioned to support only the SM laser output received from output SM passive fiber 18 (FIG. 1). However, the central core section 26 is provided with a substantially greater diameter than sections 24, which allows central core section 26 to support multiple modes. The adiabatically expanding tapered sections 30 bridging the input and output sections with respective opposite ends of central section 26 complete the configuration of feed fiber 20. The SM signal light propagating along input core section 24 is adiabatically expanded, along tapered section such that excitation of high order modes in central core section 26 is minimal and preferably nonexistent. Those high order modes that have been excited are further filtered out as the light propagates along the output tapered and end output core sections 30 and 24, respectively.

The increased diameter of central section 26 allows a threshold for NLE in general and SRS in particular to increase. With the increased diameter, however, not only the length of delivery fiber 20 (and/or 22) is increased, but the $M^2$ factor of the output light, when comparing structures of respective FIGS. 4A and 4B to the customarily used uniformly-shaped delivery fibers, is markedly lower and power losses are substantially minimized. The following table clearly illustrates the advantages of fiber system 10 that are provided with the disclosed delivery fiber over the same system but with a delivery fiber having a uniformly shaped core.

| Power kW | $M^2$ standard feed fiber | Max Length with standard delivery fiber (m) | Max Length with disclosed delivery fiber (m) | $M^2$ disclosed delivery fiber |
|---|---|---|---|---|
| 1 | ~1.05 | 5 | 10-20 | ~1.05 |
| 2 | NA | NA | 4 | ~1.1 |
| 5 | NA | NA | 4 | ≤1.2 |
| 10 | NA | NA | 2 | ≤1.5 |

As can be seen, the objective of the present invention—greater lengths of delivery fiber—is attained without sacrificing the quality of light. Moreover, with the help of the disclosed delivery fiber, the power of fiber laser systems is scaled up without sacrificing the quality of output light which was not possible in the near past but has become reality. Fiber laser systems of up to 10 kW were tested and found fully operational. When used with a standard, cylindrically shaped delivery fiber, the same fiber laser systems each had the output with $M^2$ factor incomparably higher than that with the disclosed delivery fiber. In fact, $M^2$ and power losses in laser systems provided with a standard delivery fiber were found to be practically nonoperational.

Note that the gain block GB has the same basic configuration as shown in FIG. 1 regardless of the output power within a 1 to 50 kW range. Furthermore, LH 32 of FIGS. 1-3 also may be utilized with the GB operating in a 1 to 50 kW power range.

Figure 4A:
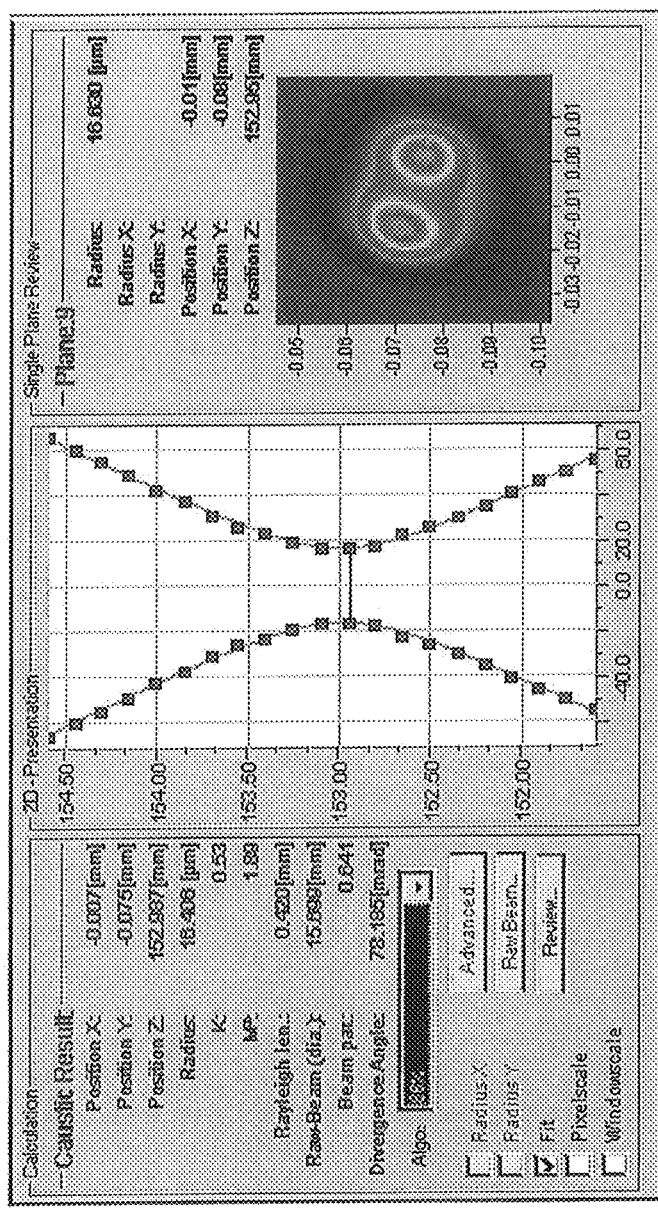
FIG. 4A is a computer generated view illustrating the quality of light at the output of the system of FIG. 1 configured with a standard delivery fiber.
Figure 4B:
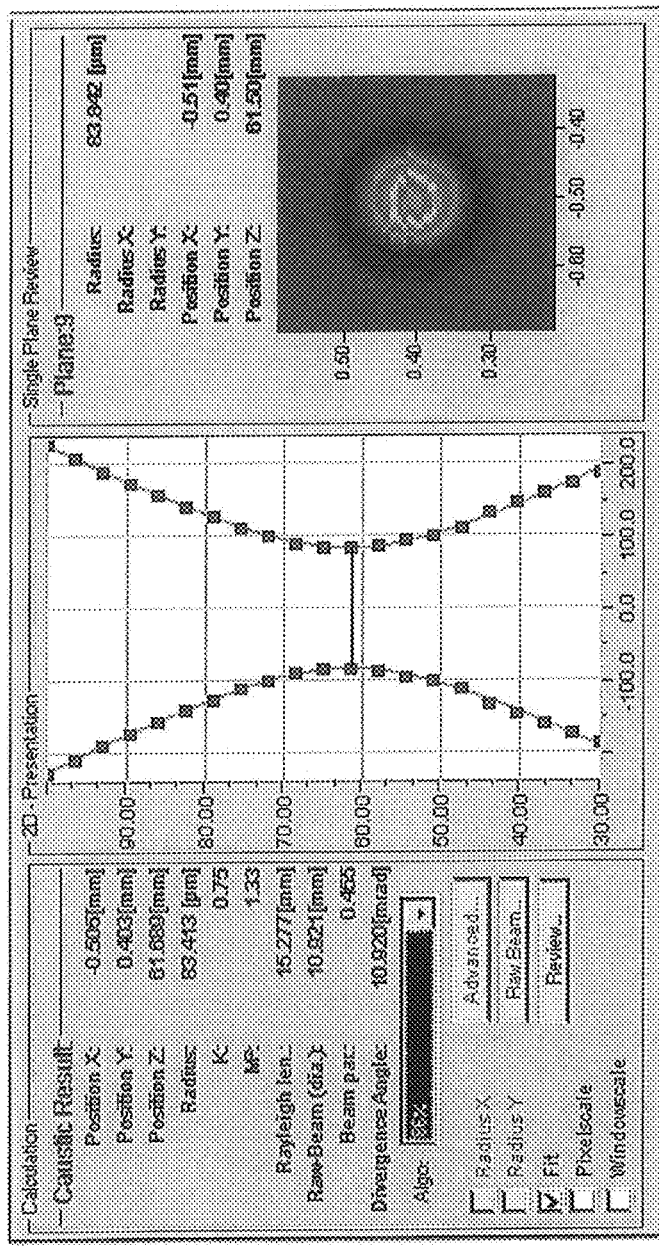
FIG. 4B is a computer generated view illustrating the quality of light at the output of the system of FIG. 1 with the disclosed delivery fiber.

FIGS. 4A and 4B illustrate respective computer generated screens illustrating the results which are obtained by testing a 10 KW SM fiber laser with standard and disclosed fibers, respectively. As can be seen, the $M^2$ factor obtained by means of standard fiber is 1.89 m. This value is substantially improved in case of the same laser system but provided with the disclosed delivery fiber which allows $M^2$ factor of 1.33 despite being substantially longer than the standard fiber.

Returning to FIGS. 1-3, inventive system 10 may also have a beam expander (not shown) coupled to the downstream end of the delivery fiber. The beam expander is made from quartz and configured to lower the power density of the output light before it is launched into laser head.

Although there has been illustrated and described in specific detail a structure of operations, it is clearly understood that the same were for purposes of illustration and that changes and modifications may be made readily therein by those skilled in the art without departing from the spirit and the scope of this invention. For example, the inventive feed fiber may be used to deliver pulsed light.

The invention claimed is:
1. A high power laser system, comprising:
a laser source outputting a single mode (SM) or low order mode kW-power light and having at least one fiber gain block which has an active fiber and an output SM passive fiber;
a passive delivery fiber spliced to the output SM passive fiber of the laser source and configured to have a double bottleneck-shaped core that is monolithic and includes:
an input end section receiving the kW power light from the laser source and an output end section, the input and output end sections each having a uniform diameter which is dimensioned to support the single mode;

a uniformly-dimensioned central section located between and having a diameter greater than that of each of the input and output end sections of the core, the central section of the core being dimensioned to support multiple modes; and input and output tapered sections extending between respective opposite ends of the central section and the respective input and output end sections, the passive delivery fiber increasing a threshold of non-linear effects so that the passive delivery fiber has a fiber length at least twice the length in comparison to a length of a passive delivery fiber with a uniformly dimensioned core, while outputting the kW-power light with a beam quality factor $M^2$ less than 2.

2. The high power laser system of claim 1, wherein the laser source is configured to output the single mode or low order mode light in a power range varying between 1 kW and 50 kW.

3. The high power laser system of claim 2, wherein the laser source is configured to output 1 kW-power light coupled into the passive delivery fiber with the double bottleneck-shaped core, the passive delivery fiber with the double bottleneck-shaped core being configured with the length varying between 10 and 20 meters while emitting the 1 kW light with the $M^2$ factor of about 1.05.

4. The high power laser system of claim 2, wherein the laser source is configured to output 2 kW-power light coupled into the passive delivery fiber with the double bottleneck-shaped core which is configured to have the length of 4 meters while emitting the 2 kW light with the $M^2$ factor of about 1.1.

5. The high power laser system of claim 2, wherein the laser source is configured to output 5 kW-power light coupled into the passive delivery fiber with the double bottleneck-shaped core which is configured to have the length of 4 meters while emitting the 5 kW light with the $M^2$ factor less than 1.2.

6. The high power laser system of claim 1, wherein the laser source is configured to output 10 kW-power light coupled into the passive delivery fiber with the double bottleneck-shaped core which is configured to have the length of 2 meters while emitting the 10 kW light with the $M^2$ factor of about 1.5.

7. The high power laser system of claim 1, wherein each of the input and output end sections are configured to have either identical dimensions or dissimilar dimensions.

8. The high power laser system of claim 7, wherein the input and output end sections are configured to have the dissimilar dimensions such that the output end section is shorter than the input end section and has a length in a range between a few millimeters and tens of centimeters.

9. The high power laser system of claim 1, further comprising a laser head, wherein the passive delivery fiber with the double bottleneck-shaped core includes at least one of a passive fiber extending between the output SM passive fiber of the laser source and the laser head or a passive fiber extending between the laser head and a workpiece to be laser beam treated.

10. The high power laser system of claim 1, wherein the at least one fiber gain block includes an input SM passive fiber and an active fiber, the active fiber having a downstream end coupled to an input end of the output SM passive fiber.

* * * * *